June 24, 1941.  C. A. VAN DERVEER  2,247,264
REVOLVING CAR SEAT
Filed Feb. 21, 1938  8 Sheets-Sheet 3
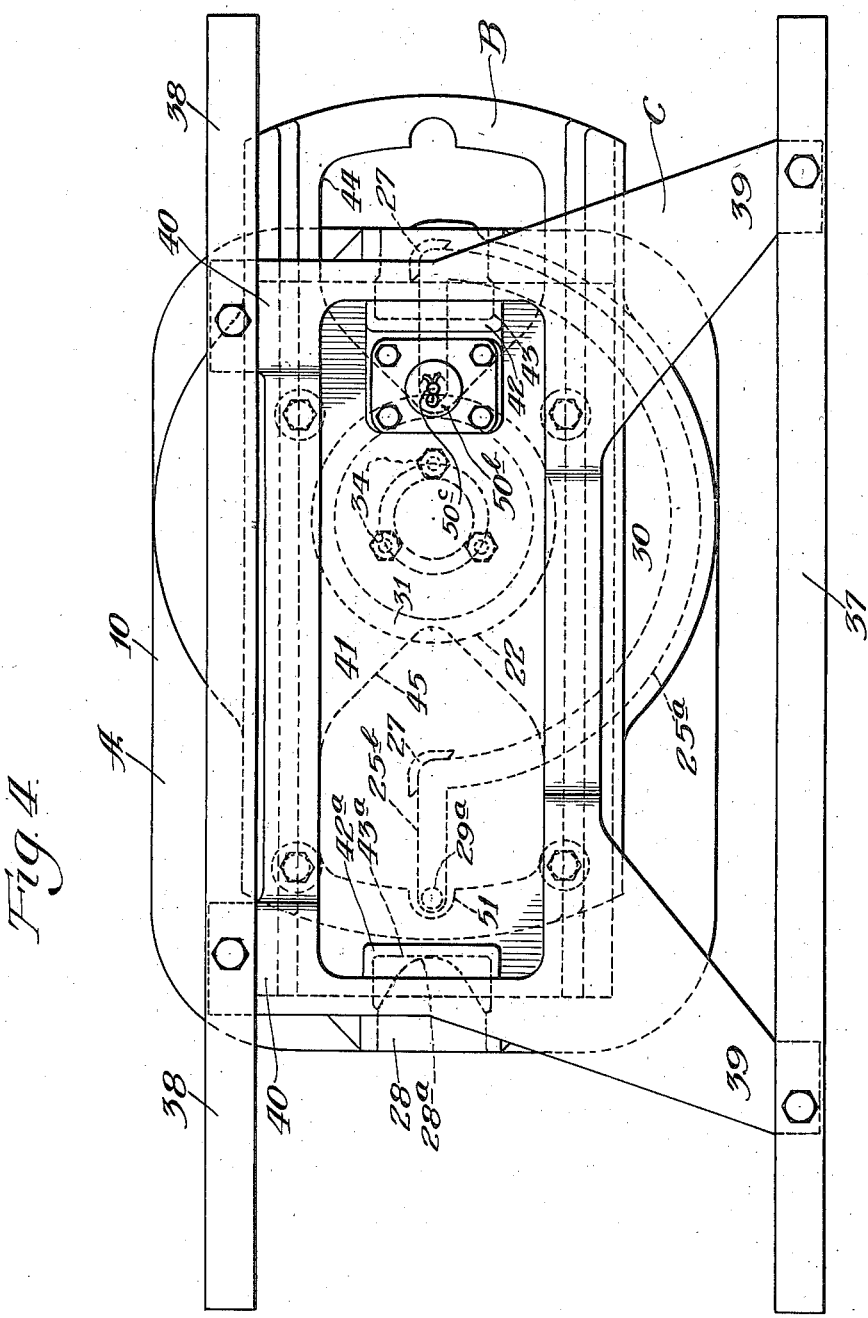

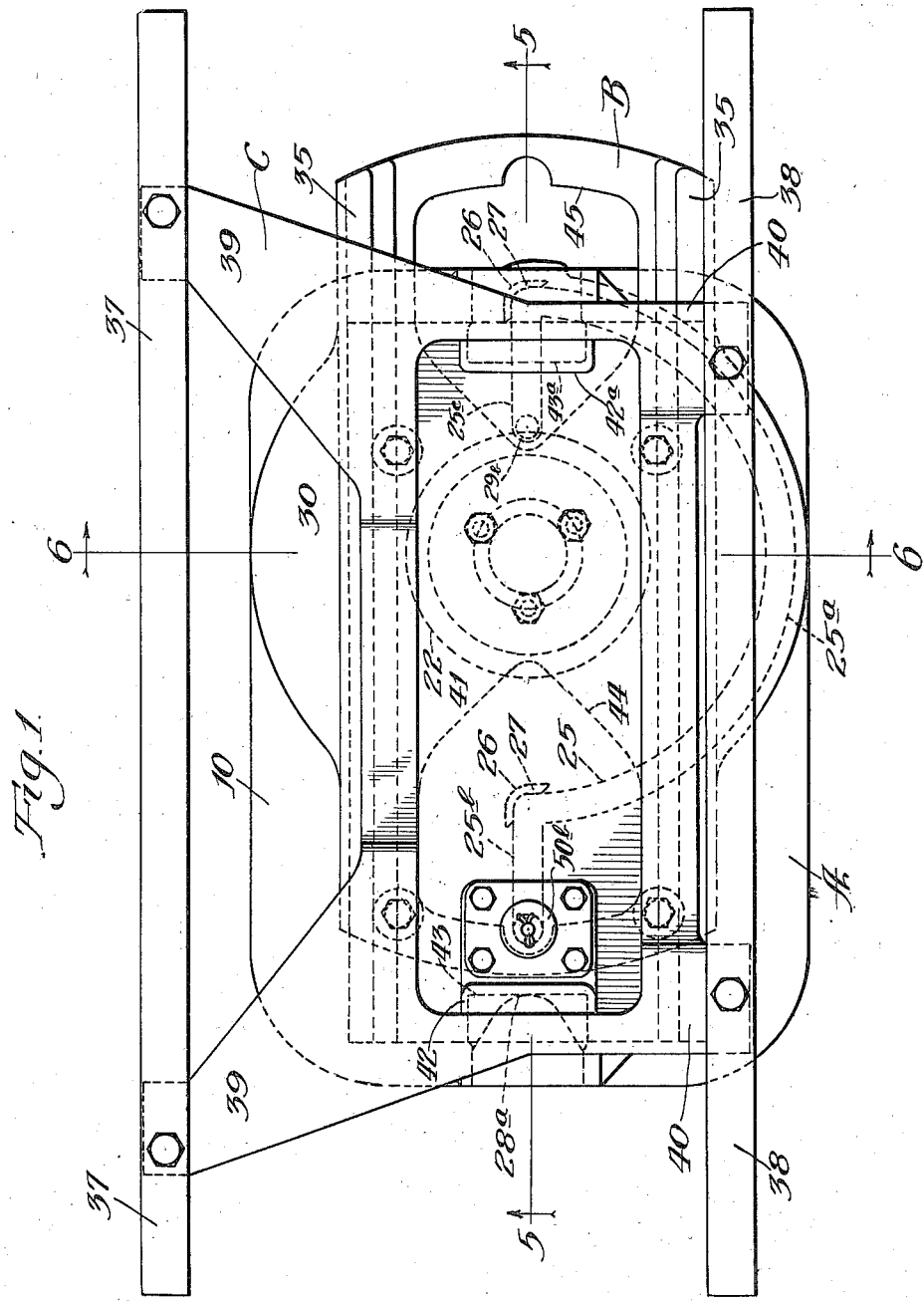

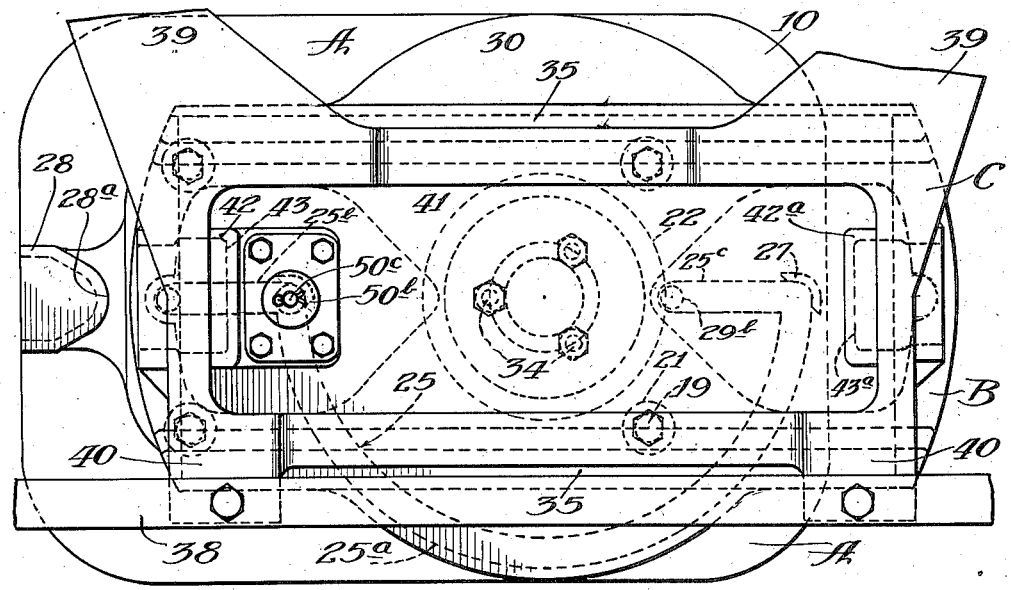
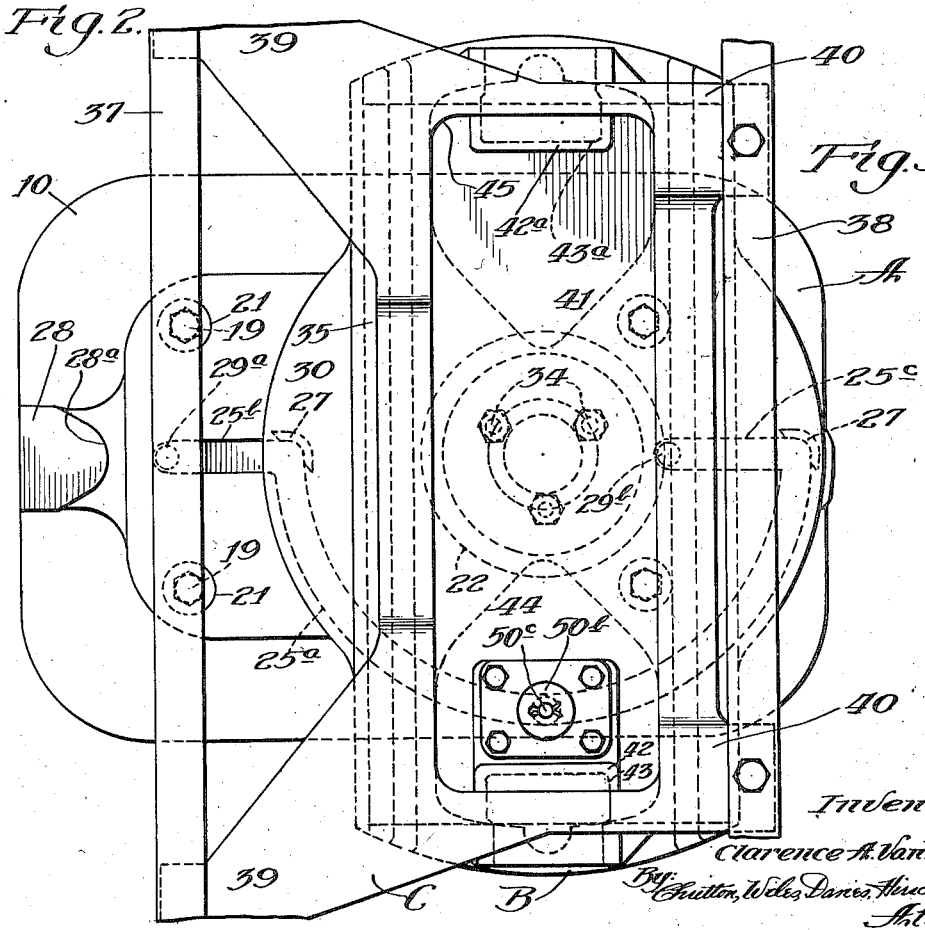

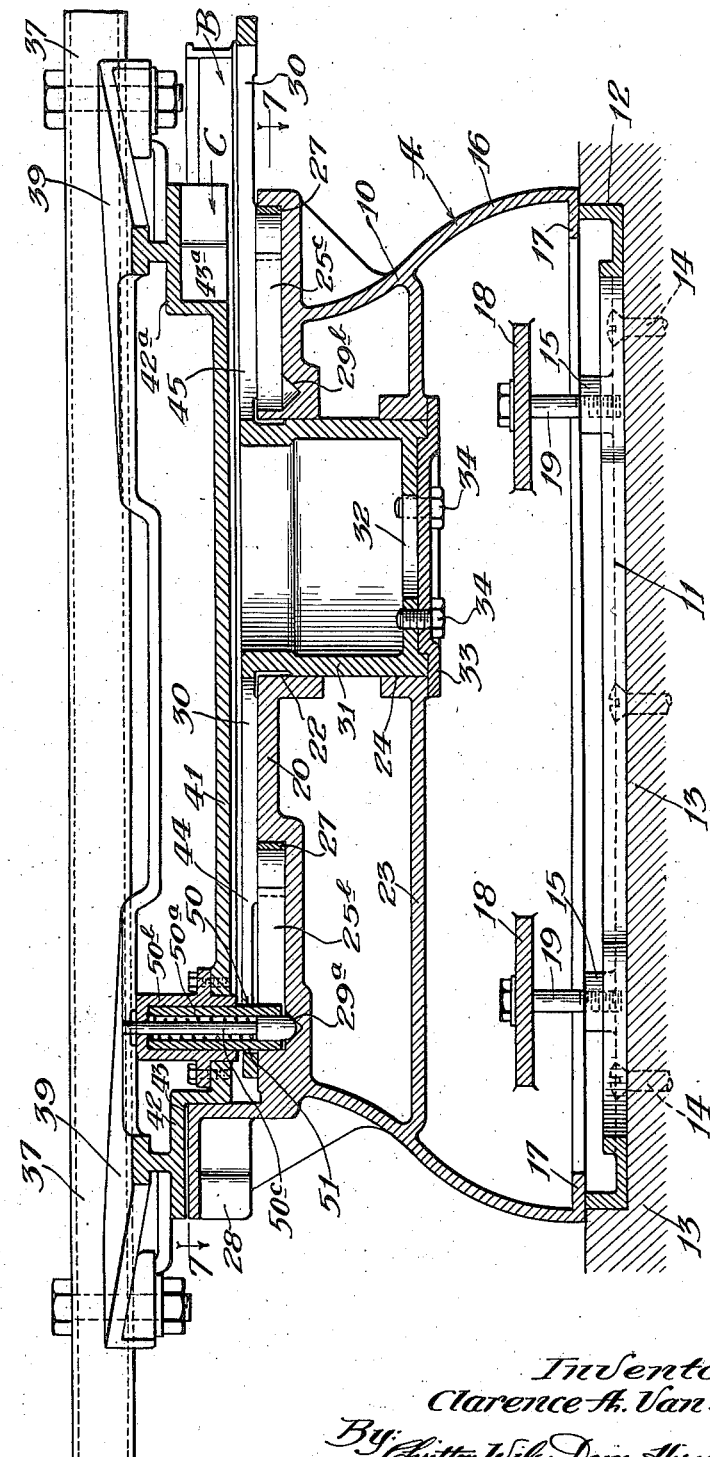

June 24, 1941.  C. A. VAN DERVEER  2,247,264
REVOLVING CAR SEAT
Filed Feb. 21, 1938   8 Sheets-Sheet 5

Inventor:
Clarence A. VanDerveer,
By Chritton, Wiles, Davies, Hirsch & Dawson
Attorneys.

June 24, 1941.   C. A. VAN DERVEER   2,247,264
REVOLVING CAR SEAT
Filed Feb. 21, 1938   8 Sheets-Sheet 6
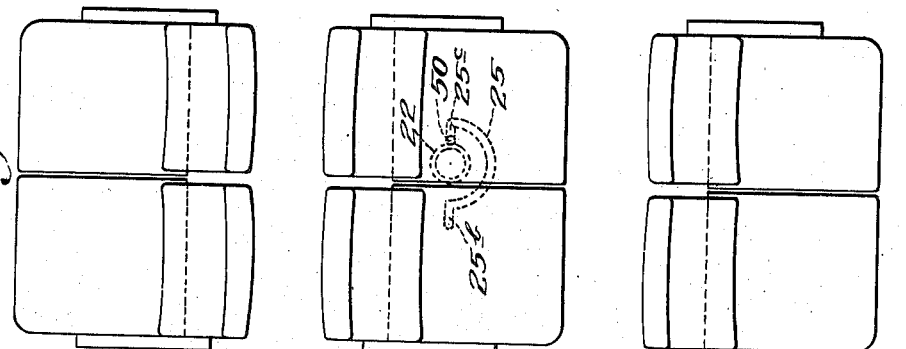
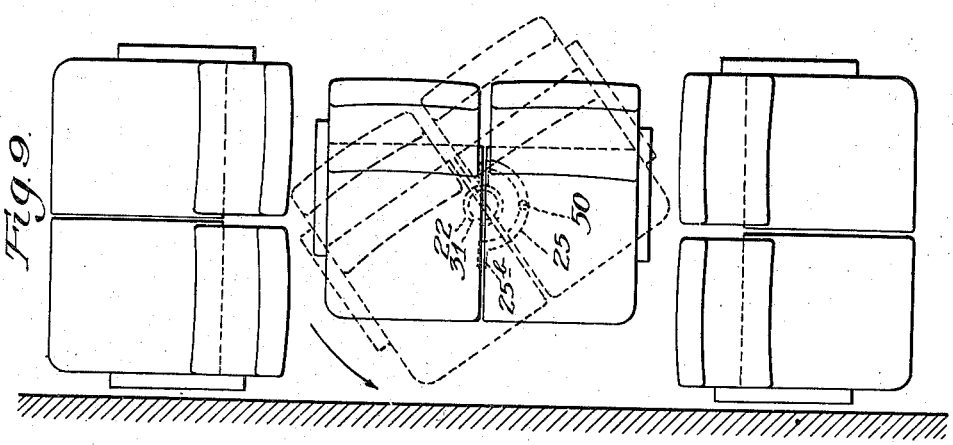
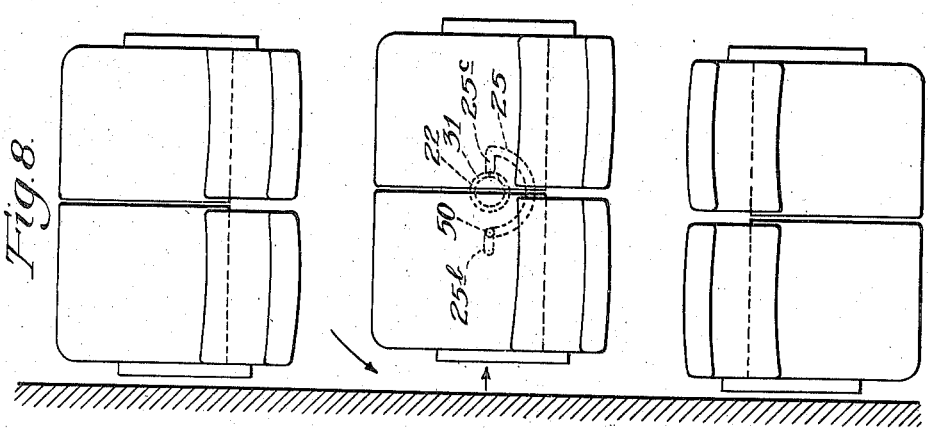
Inventor:
Clarence A. Van Derveer,
By Chritton, Wiles, Davies, Hiechl & Damon
Attorneys June 24, 1941. C. A. VAN DERVEER 2,247,264
REVOLVING CAR SEAT
Filed Feb. 21, 1938 8 Sheets-Sheet 7

Inventor:
Clarence A. Van Derveer
By: Chritton, Wiles, Davies, Hirsch & Dawson
Attorneys Patented June 24, 1941

2,247,264

UNITED STATES PATENT OFFICE 2,247,264

REVOLVING CAR SEAT

Clarence A. van Derveer, Chicago, Ill., assignor to S. Karpen & Bros., Chicago, Ill., a corporation of Illinois Application February 21, 1938, Serial No. 191,774

5 Claims. (Cl. 155—96)

This invention relates particularly to a seat adapted for use in railroad coaches and buses, although the invention may be usefully employed in other situations.

An object of the invention is to provide an improved seat which may be reversed in direction and which may be laterally shifted so as to allow sufficient clearance for turning when the seat is mounted adjacent the side of a coach or bus. Another object is to provide a seat which may be shifted directly to one side before being reversed and which may be shifted directly back to normal position after being reversed.

Another object is to provide improved means for guiding the shifting and turning movement of the seat. Yet another object is to provide novel means for locking the seat when in normal position.

A further object is to provide a seat of strong and sturdy construction which can be operated with greater convenience.

Figure 6:
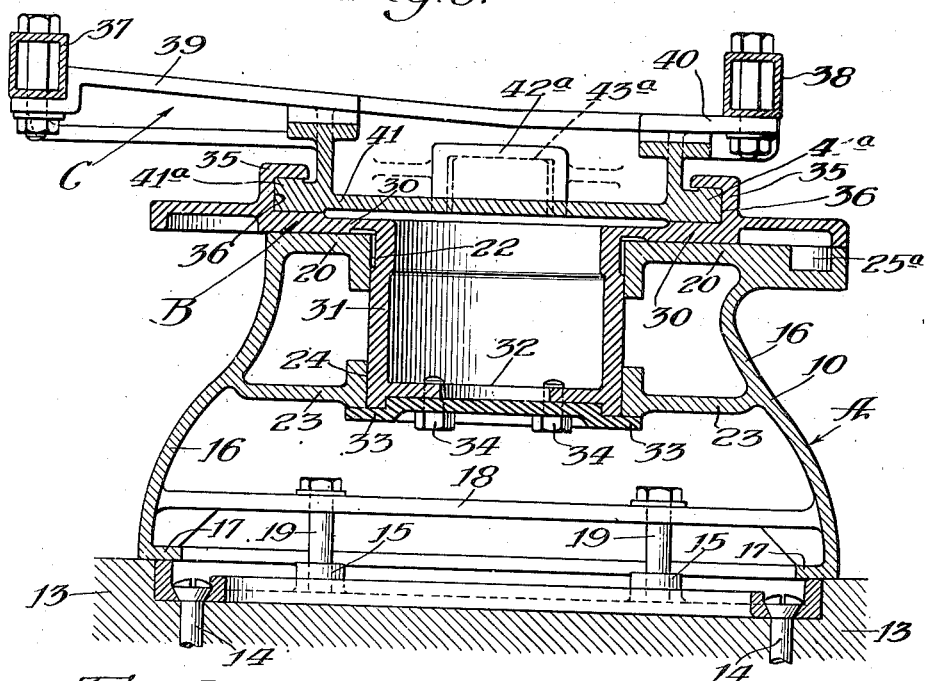
Figure 7:
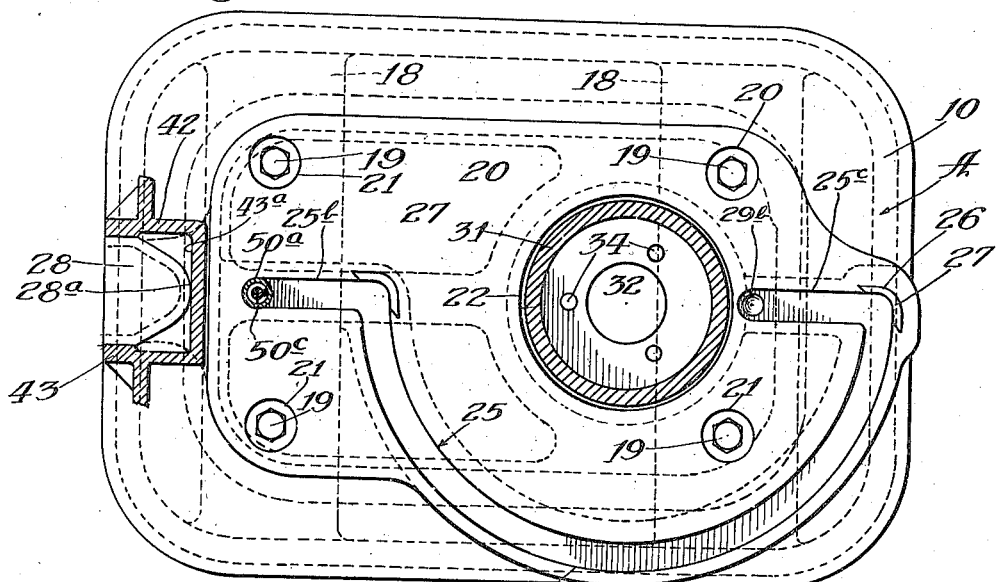
Figure 11:
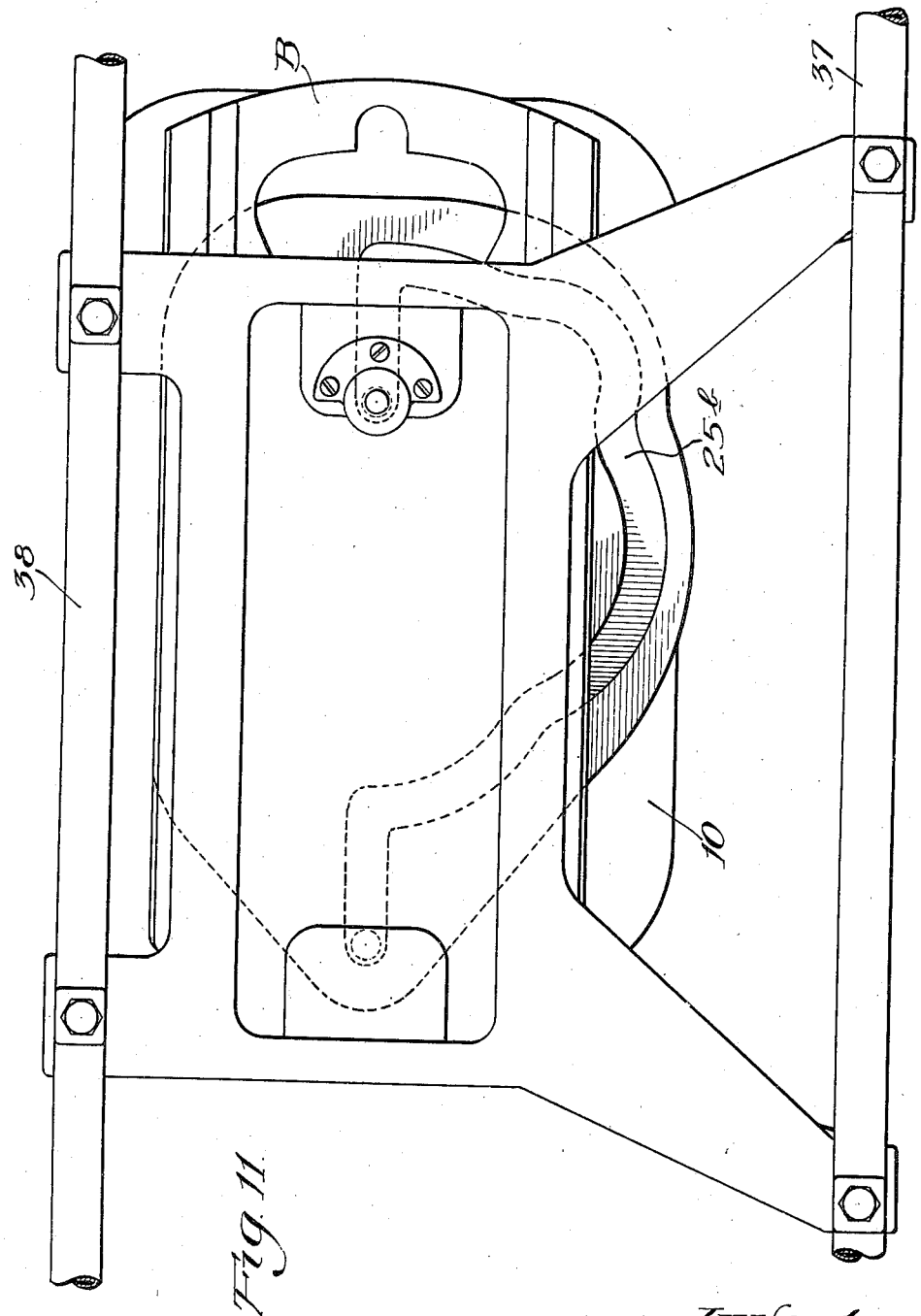
Figure 12:
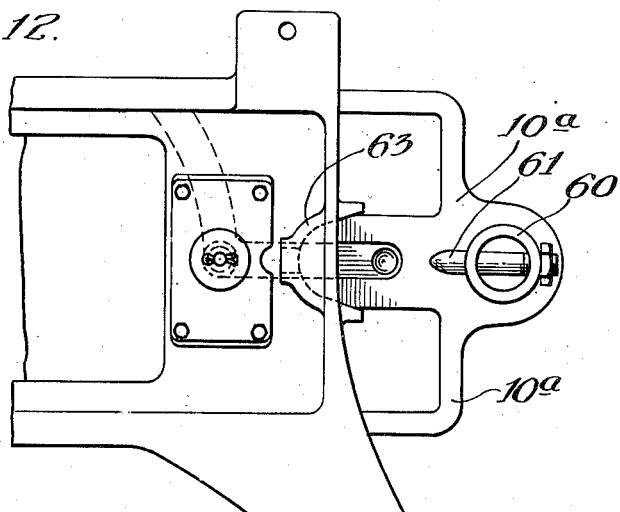
Figure 13:
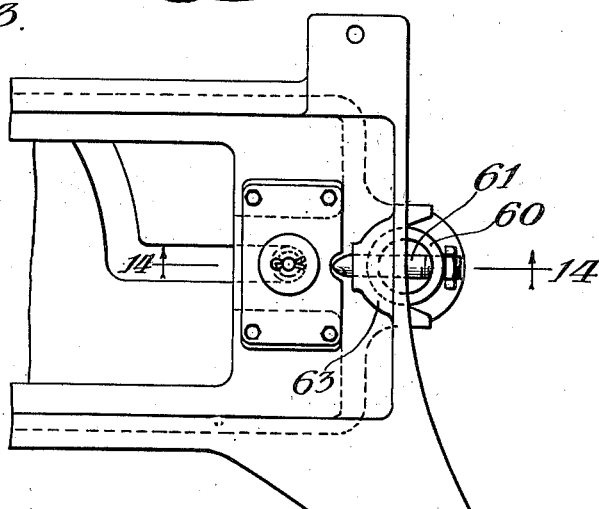

The invention is illustrated in its preferred embodiment in the accompanying drawings, in which:

Fig. 1 is a plan view of the improved structure, the parts being shown in position to support a chair in its normal lateral position adjacent the side of a car and facing forwardly; Fig. 2, a view similar to Fig. 1 but showing the chair supporting structure shifted laterally to one side in preparation for turning; Fig. 3, a view similar to Figs. 1 and 2, but showing the seat supporting structure turned through 90°; Fig. 4, a view similar to Figs. 1-3, but showing the seat supporting structure in its normal lateral position after having been turned through substantially 180°; Fig. 5, a sectional view in elevation, the section being taken as indicated at line 5—5 of Fig. 1; Fig. 6 a sectional view in elevation taken as indicated as line 6—6 of Fig. 1; Fig. 7, a plan sectional view taken as indicated at line 7—7 of Fig. 5; Fig. 8, an illustrative plan view showing the seat in its normal lateral position adjacent the side of a car; Fig. 9, a view similar to Fig. 8, but showing the seat as it is being turned in reversal; Fig. 10, a view similar to Figs. 8 and 9 but showing the seat in its normal lateral position after being reversed; Fig. 11, a plan view of a modified form of construction embodying my invention; Fig. 12, a broken plan view of another modified form of construction; Fig. 13, a broken plan view of the construction shown in Fig. 4, the parts being shown in a different position; and Fig. 14, a broken vertical sectional view, the section being taken as indicated at line 14 of Fig. 13.

In the illustration given, A designates a base; B, a guide block pivotally mounted on base A; C, a carriage in slidable engagement with block B.

The base A preferably comprises a casting 10 of any suitable metal which may be secured to the floor of a coach or bus by the use of the bottom plate 11. As shown more clearly by Figures 5 and 6, bottom plate 11 may be annular in form and secured within a recess 12 in floor 13 by means such as screws 14. Plate 11 has its top of its outer peripheral edges flush with the surface of floor 13, and may be provided with the tapped bosses 15 for use in securing casting 10.

The base casting 10 has the side walls 16 which may be of any desired form or curvature and which may be equipped at their bottoms with the inturned flange 17 adapted to rest on the peripheral edge portion of the bottom plate 11. Straps 18 extending between walls 16 have bolts 19 extending downwardly through them and engaging the tapped holes within bosses 15 to secure the casting 10 tightly to base plate 11.

The top wall 20 of base A is provided with openings 21 through which access may be had for inserting bolts 19 and is provided with the relatively large opening 22 for receiving a portion of the guide block B. A second wall 23, spaced below wall 20, has its edges joined with side wall 16 and is provided with the opening 24 which registers with the opening 22 in wall 20.

Wall 20 has its top surface provided with the cam track 25 having a semi-circular portion 25$^a$ which is concentric with the opening 22. The end portions 25$^b$ and 25$^c$ of the cam track 25 extend laterally from the diametrically opposite ends of the curved portion 25$^a$. Adjacent the junctions of end portions 25$^b$ and 25$^c$ with the curved portion 25$^a$ the wall 20 is provided with the corner grooves 26 having beveled ends. In these grooves are placed the bumper pieces 27 which may be of hardened steel or other suitable material.

On the side of base A which is to be placed adjacent the side of the coach is a lug structure 28 which extends slightly above top wall 20 and preferably has its nose portion 28$^a$ rounded.

At the extreme ends of slot 25 are slight recesses 29$^a$ and 29$^b$ which cooperate with a plunger for releasably locking the carriage C as will appear more clearly later in this description.

The guide block B comprises a plate 30 which is supported on the flat top surface of the top base wall 20. Integral with plate 30 or fixedly secured to this plate is a downwardly extending cylindrical portion 31 which is received within openings 22 and 24 of walls 20 and 23, respectively. Portion 31 is provided at its lower end with the inwardly extending annular flange 32; and a retaining flange 33, engaging the underside of wall 23, is secured to portion 31 by bolts 34 extending into flange 32.

Thus mounted, the guide block B is supported on wall 20 of base A, and is rotatable about the center of opening 22. Extending upwardly from plate 30 of block B are the flanges 35 which form the edge grooves 36 adapted to slidably receive the front and back edges of the chair carriage C.

Carriage C comprises a pair of spaced rails 37 and 38 which may be secured in any suitable manner to the underside of a chair frame. The front supporting arms 39 are attached at their ends with rail 37 in any suitable manner, and the rearwardly extending supporting arms 40 are attached at their ends to the rail 38. A lower wall 41 of carriage C rests upon plate 30 of block B and has its edges 41a slidably received in grooves 36. At its one end carriage C has a shell structure 42 which provides the socket 43 opening toward the end of the carrier and adapted to receive the lug 28 therein, and at its other end is a similar structure 42a providing the socket 43a also adapted to engage lug 28.

Plate 30 of the block B is cut away to provide the openings 44 and 45, and through opening 44 extends a stud 50 carried by the carriage C and engaging the cam track 25. Stud 50 may comprise a sleeve or roller 50a which has its lower end extending into track 25 and which has its upper end contained in a housing 50b which is attached to the wall 41 of the carriage. Within sleeve 50a is a spring pressed plunger 50c which is urged against the bottom of the cam track and which, when the carriage is in normal lateral position, engages the recess 29a in the bottom of track portion 25b.

When the improved seat is mounted in a coach or bus, the chair structure supported on carriage C will normally be adjacent the side of the coach and the carriage will be in the position shown in Fig. 1, with plunger 50c resiliently engaging the recess 29a, and with socket 43 engaged by lug 28. It will be seen that the carriage cannot be rotated while in this normal lateral position, for the engagement of lug 28 with socket 43 rigidly locks the carriage against turning movement. Also the semi-circular notch 51 in the edge of opening 44 engages the sleeve 50a, further locking the carriage against angular movement.

When it is desired to turn the seat so as to cause the chair to face a rearward direction, the chair and carriage C may be pulled laterally directly away from the side of the coach. Upon such lateral movement of the carriage, the spring pressed plunger 50c moves upward and out of recess 29a and the stud 50 moves along the straight end portion 25b of the track 25. Upon reaching the end of portion 25b the sleeve 50a strikes the bumper piece 27 and the carriage is prevented from further lateral movement. Figure 2 illustrates the position of the parts at this point in the operation. Socket 43 of the carriage is now moved free of lug 28, and the carriage and block are free to rotate.

After the chair and carriage C have been moved to this side position, the chair will be removed from the side of the coach and upon being rotated will clear the side of the coach.

It will be remembered that the block B is pivotally secured to the base, and lateral movement of the carriage is permitted by reason of the sliding engagement of the carriage with grooves 36 of the block. As the chair is moved laterally away from the side of the coach, carriage C slides along one axis of block B and this block does not move, but when the side position is reached and stud 50 reaches the curved portion 25a of the cam track, the carriage and the block both rotate about an axis at the center of the opening 22.

Where, as in the present embodiment, the curved portion 25a of the track is arcuate in form and concentric with opening 22, there is no relative movement between the carriage and block while the seat is being rotated. However, it is within the scope of this invention to have the curved portion 25a of other than arcuate form or arcuate about some other center, and in such cases there would be relative movement between the carriage and block as this seat is rotated. This track may be curved to produce any desired lateral movement of the carriage. When the curvature of the track guides the stud 50 away from the center of the opening 22, the carriage will be moved laterally to one side, and when the curvature of the track guides the stud 50 toward the center of opening 22 the carriage will be moved back toward normal lateral position.

When, in the present embodiment, the seat has been turned through a half revolution or substantially 180°, stud 50 will have traveled along the cam track to the straight end portion 25c and will impinge the bumper 27 at this junction. Then no further rotation is possible, and the seat may be moved back laterally toward the side of the coach, the stud 50 moving in the end portion 25c of the cam track and finally moving to the end of this track portion where the plunger 50c enters the recess 29b in the bottom of the cam track. As the seat is pushed back to its normal lateral position, the socket 43a is pushed over and in engagement with the lug 28 to effectively anchor the seat against angular movement while in this reversed position.

The above operation takes place when the seat is being changed from a position adjacent the side of a coach and facing in one direction to a position adjacent the side of a coach and facing in a reverse direction. When it is desired to change the seat again back to its original position, the chair and carriage may again be pulled laterally to the side position, turned in a reverse direction to 180°, and then pushed back to its normal lateral position.

With the base attached to the floor of a car or bus as herein described, the seat may be conveniently removed for cleaning by merely inserting a tool through holes 21 and loosening bolts 19. The screws 14 which extend into the floor need not be disturbed, and the bottom plate 11 can always be left securely in place.

In the modification shown in Fig. 11, the construction is substantially the same as shown in Fig. 1, save that the cam groove 25b is not substantially circular, as groove 25a, but is irregularly curved, thus producing an irregular movement of the seat as it is rotated. By this means a more effective turning of the seat can be accomplished in less space.

Figure 14:
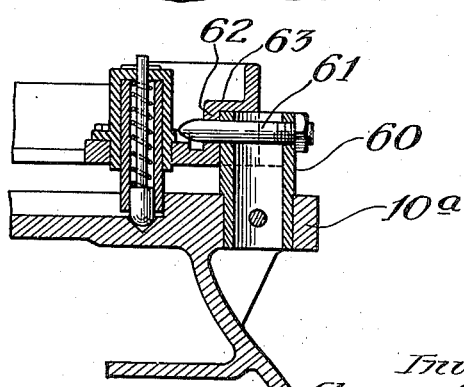

In the modification shown in Figs. 12, 13 and 14, the base casting member 10a is provided with a tubular member 60 through which is extended a pin 61. The pin 61 extends through a socket formed within the member 62 of the shiftable carriage member 63. By this means, a definite locking support is accomplished which prevents any rocking whatever by the member 63, the steel pin 61 being sufficient to support the member 62. The pin 61, which engages the member 63 of the carriage, serves the same function heretofore described in connection with the main carriage and the locking end pieces carried by the base. In other words, in the movement of the carriage and the block, wherein the block has an angular movement of approximately 180°, there has been shown a lug and socket means for locking the carriage into position. Likewise, when swung through another movement of 180°, the carriage is locked by the lug and socket arrangement in the other position. The structure shown in Figs. 12 and 13 corresponds with the lug and socket structure already described but shows a considerably improved structure in which simple means not only serve as locking means but as supporting and stiffening means, the steel pin 61 serving to support the member 62.

Obviously, the structure may be changed in many respects without departing from the spirit of my invention. The foregoing detailed description has been given for clearness of understanding only and no unnecessary limitations should be understood therefrom, but the appended claims should be construed as broadly as permissible, in view of the prior art.

What I claim as new and desire to secure by Letters Patent, is:

1. In combination, a base equipped with a semicircular cam track, a block carried by said base and rotatable thereon about a fixed axis, a chair carriage slidably mounted upon said block and movable laterally of said axis, and a cam stud carried by said carriage and adapted to engage said cam track.

2. In combination, a base equipped with a cam track, a guide block pivotally mounted on said base, a carriage slidably engaging said block, cam means carried by said carriage and engaging said cam track for controlling the relative movement of said carriage and block upon movement of said block about its pivot, and means including a lug and socket for locking said carriage in positions substantially 180° apart.

3. In combination, a base, a guide block pivotally mounted on said base, a carriage slidably carried by said block, and means for controlling the relative movement of said carriage and block according to the angular position of said block relative to its pivot, said means including a track carried by said base having a curved portion and laterally extended end portions and a stud fixed to said carriage and adapted to engage said cam track, said means being adapted by reason of the shape of said track to guide said carriage laterally of said base when said stud engages either of the end portions of said track and being forced thereby to guide said carriage in angular movement while said stud engages the curved portion of said track.

4. In combination, a base equipped with a cam track having an opening extending downwardly of its top, a guide block carried by said base and having a downwardly extending cylindrical portion rotatably held within said opening, and a chair carriage slidably engaging said block and carrying a cam stud adapted to engage said cam track.

5. In combination, a base equipped with a top wall having an opening therethrough and equipped with a cam track, said base also having a second wall having an opening therethrough aligned with said first mentioned opening, a guide block rotatably carried on said top wall of the base and having a cylindrical portion extending downwardly through said openings, a flange piece attached to said cylindrical portion and engaging the underside of said second wall, and a chair carriage slidably engaging said block and carrying a cam stud adapted to engage said cam track.

CLARENCE A. van DERVEER.